May 2, 1967 L. L. WEISGLASS 3,316,804
ILLUMINATING APPARATUS FOR PHOTOGRAPHIC PRINTERS
AND ENLARGERS WITH SPECULAR MIRRORS
Filed March 15, 1965
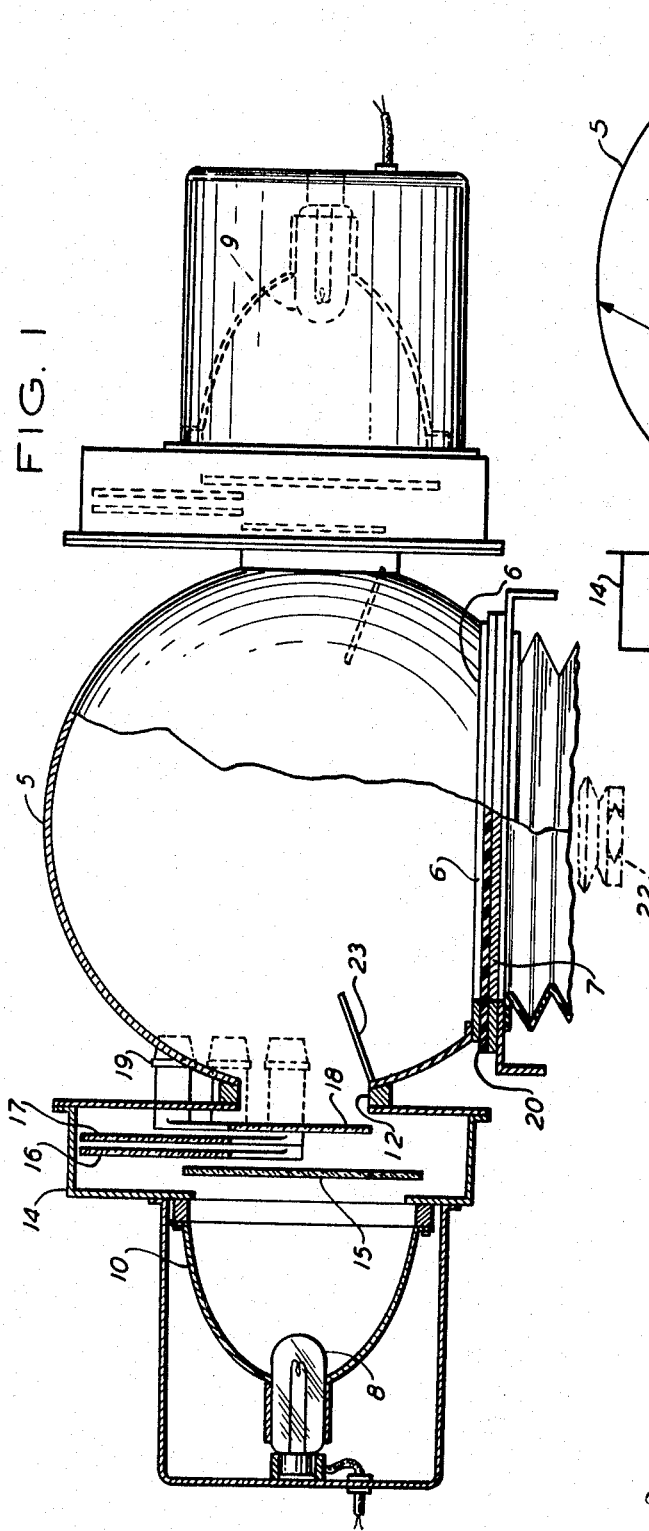
INVENTOR.
LOUIS L. WEISGLASS
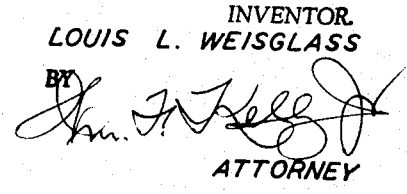
ATTORNEY

United States Patent Office 3,316,804
Patented May 2, 1967

3,316,804
ILLUMINATING APPARATUS FOR PHOTOGRAPHIC PRINTERS AND ENLARGERS WITH SPECULAR MIRRORS
Louis L. Weisglass, New York, N.Y., assignor to Simmon Brothers, Inc., Long Island City, N.Y., a corporation of New York
Filed Mar. 15, 1965, Ser. No. 439,653
3 Claims. (Cl. 88—24)

The present invention relates to illuminating apparatus for the copying or enlarging of photographic negatives or transparencies and especially to an apparatus where diffused light is used for this purpose. Apparatus of this type is shown and described in U.S. Patent No. 3,028,483, granted Apr. 3, 1962, to Alfred Simmon, and assigned to the same assignee as the present invention.

One disadvantage inherent in the apparatus as shown and described in such patent resides in the fact that the area of the negative or transparency does not receive homogeneous illumination causing streaks and patches of variable density to appear on the finished prints. Despite the fact that a mixing chamber is utilized into which a light beam is horizontally projected from a light collector, with such light being thoroughly mixed by the diffusely reflecting interior surface of the spherical mixing chamber, there is nevertheless a portion of the incident light beams that do not strike the diffusely reflecting interior surface of this spherical mixing chamber. On the contrary such incident light beams emerge directly through the bottom exit aperture and hence not being integrated by the mixing chamber result in the above mentioned streaks and patches of variable density which appear on the finished prints.

It is accordingly the primary object of the present invention to provide an illuminating apparatus for the copying or enlarging of film transparencies which utilizes a mixing chamber having a diffusely reflecting interior surface for thoroughly mixing and homogeneously integrating the light emerging from its exit aperture and wherein such mixing chamber is provided with an intercepting member to prevent the passage of light beams directly from its entrance aperture to its exit aperture.

Another object of the present invention is the provision of an illuminating apparatus for the copying or enlargement of film transparencies utilizing a spherical mixing chamber having a diffusely reflecting interior surface and wherein such chamber is provided with a specular mirror positioned between the light entrance aperture and its exit aperture so as to intercept all direct light beams and assure that only thoroughly mixed and homogeneously integrated light emerges from the exit aperture and hence evenly and uniformly over the adjacent film transparency.

The foregoing objects together with others which will become readily apparent to those skilled in the art as the following description proceeds are achieved in accordance with the present invention by the provision of an illuminating apparatus for the copying or enlargement of film transparencies wherein a mixing chamber having a diffusely reflecting interior surface is utilized which is provided with one or more light entrance windows in the identical manner as that shown in the above mentioned Simmon Patent No. 3,028,483. Such mixing chamber is then provided with an angularly extending specular mirror adjacent the light entrance aperture so that all light beams that would otherwise pass directly from these light entrance apertures to the light exit aperture are intercepted by such specular mirror and reflected to the diffusely reflecting interior surface of the mixing chamber. This assures that all the light entering the mixing chamber is first thoroughly mixed and homogeneously integrated before it emerges from the exit window and is then evenly and uniformly distributed over the adjacent film transparency.

The present invention may be more fully appreciated by reference to the accompanying drawing wherein:

FIGURE 1 is an elevational view partly in section showing an illuminating apparatus for the copying or enlargement of film transparencies and constructed in accordance with the present invention, and FIGURE 2 is a schematic illustration showing the direction taken by one or more light beams from their source to the exit aperture of the mixing chamber.

Referring now to the drawing in detail the illuminating apparatus as shown in FIG. 1 is like that shown and described in the above noted Simmon Patent No. 3,028,483 in that it comprises a substantially spherical mixing chamber 5 provided with a diffusely reflecting interior surface and having an exit aperture 6 adjacent to which the film transparency 7 to be printed or enlarged is disposed so that the mixed homogeneous light from the interior of the mixing chamber 5 is evenly and uniformly distributed over such transparency 7. Also, the apparatus is shown as having two light sources 8 and 9 disposed diametrically opposite each other and since these are identical in all material respects only one such source will be described in detail. The light source 8 in the form of an incandescent lamp is disposed at one focal point of a light collector in the form of an elliptical specular reflector 10, with the light outlet orifice of this reflector and also comprising the light entrance aperture 12 of the mixing chamber 5, disposed in a plane somewhat short of the other focal point 13 (FIG. 2) of such reflector 10.

For the purpose of preventing the infra-red radiations from the light source 8 reaching the film transparency 7, the illuminating apparatus is provided with a housing 14 containing an infra-red filter in the form of a disc 15 of heat absorbing glass. Also disposed within the housing 14 are a plurality of color filters, such as a cyan filter 16, a yellow filter 17, and a magenta filter 18, each of which has an area greater than that of the entrance aperture 12 of the mixing chamber. Each such filter is operated by a suitable control knob 19 so that the operator can position one or more of such color filters partially or entirely over the area of the light entrance aperture 12, in the identical manner as shown and described in the aforesaid Patent No. 3,028,483, and thus intercept the light beam and produce integrated colored light of desired density at the exit aperture 6 and over the adjacent film 7.

By reference now more particularly to FIG. 2, it will be noted that in the illuminating apparatus thus far described, and as shown in the above-noted Simmon Patent No. 3,028,483, certain light beams such as "a" and "b" (FIG. 2) do not strike the diffusely reflecting interior surface of the mixing chamber 5 but on the contrary pass directly from the entrance aperture 12 to the exit aperture 6 where they impinge upon an opalized plastic disc or the like 20. This results in the light being unmixed and non-homogeneous with a large percentage thereof reaching the photographic lens 22 (FIG. 1) and being imaged at the easel thereby resulting in a print having streaks and patches of variable density due to this lack of light integration. Since it is virtually impossible because of mechanical and dimensional reasons as well as increased manufacturing costs, to change the location of the light source to prevent direct radiation passing to the exit aperture, the present invention provides a specular mirror 23.

This specular mirror 23 is positioned adjacent the entrance aperture 12 of the mixing chamber 5 and is inclined upwardly as shown in the drawing, so that the previous light beams "a" and "b" and all other similar beams that would otherwise pass directly to the opalized disc 20 in the exit aperture 6, are now intercepted and pass upwardly, such as shown as beams "ar" and "br" where they strike the diffusely reflecting surface of the mixing chamber 5 and are thoroughly mixed and integrated along with the other beams before they pass through the exit aperture 6 on to the opalized disc 20 and on to the film transparency 7. The underside of the specular mirror 23 is provided with a white surface in order to facilitate the mixing and integration of all the light within the spherical mixing chamber 4 while its reflecting surface may be of alzak aluminum or any other highly reflective mirrored surface.

It should thus be apparent from the foregoing that an illuminating apparatus for the making of photographic prints and enlargements from a film negative has been provided by the present invention wherein all light beams entering the diffusely reflecting mixing chamber are so intercepted and reflected as to preclude any such light beams passing directly out the exit aperture thereby assuring thorough mixing of the light to produce complete integration and homogeneity thereof.

Although one specific embodiment of the present invention has been herein shown and described it is to be understood that still further modifications thereof may be made without departing from the spirit and scope of the appended claims.

I claim:

1. An illuminating apparatus for photographic printers and enlargers for producing thoroughly mixed homogeneous light over the surface of a film transparency comprising:
   (a) a light collector in the form of a hollow elliptical body having a specular reflecting surface and a light source at one end with an outlet orifice at its other end,
   (b) a spherical mixing chamber provided with a diffusely reflecting interior surface and having a light inlet aperture coinciding with the light outlet orifice of said light collector and a light exit aperture disposed normal to its light inlet aperture, and
   (c) means carried by said spherical mixing chamber and disposed at an acute angle relative to the axis of its light inlet aperture and positioned between the latter and the light exit aperture of said spherical mixing chamber, and said means being thus across the path of light from said inlet aperture to prevent direct light from said light collector passing to the light exit aperture of said spherical mixing chamber and to a film transparency positioned adjacent thereto.

2. An illuminating apparatus for photographic printers and enlargers as set forth in claim 1 wherein the means carried by the mixing chamber comprises a specular mirror angularly disposed adjacent the light inlet aperture to prevent direct light from passing to said light exit aperture and to cause all such light to be thoroughly mixed and integrated within said spherical mixing chamber prior to emergence thereof through said light exit aperture to the adjacent film transparency.

3. An illuminating apparatus for photographic printers and enlargers as set forth in claim 2 wherein the angularly disposed specular mirror has a highly reflective upper surface and a diffusely reflecting under surface to facilitate complete mixing and integration of the light within the boundaries of the spherical mixing chamber.

References Cited by the Examiner

UNITED STATES PATENTS 3,028,483   4/1962   Simmon _____ 88—24
3,135,471   6/1964   Clapp _____ 240—3.1

NORTON ANSHER, Primary Examiner.

J. M. HORAN, Examiner.

F. L. BRAUN, Assistant Examiner.